United States Patent
Tamura et al.

(10) Patent No.: US 10,042,323 B1
(45) Date of Patent: Aug. 7, 2018

(54) DEVELOPING DEVICE AND IMAGE FORMING APPARATUS

(71) Applicant: FUJI XEROX CO., LTD., Tokyo (JP)

(72) Inventors: Kazuya Tamura, Kanagawa (JP); Masafumi Kudo, Kanagawa (JP); Koji Udagawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/715,662

(22) Filed: Sep. 26, 2017

(30) Foreign Application Priority Data

Mar. 9, 2017 (JP) ................................. 2017-044840

(51) Int. Cl.
*G03G 21/20* (2006.01)
*G03G 15/08* (2006.01)
*G03G 15/20* (2006.01)
*G06F 1/20* (2006.01)

(52) U.S. Cl.
CPC ....... *G03G 21/206* (2013.01); *G03G 15/0887* (2013.01); *G03G 15/2064* (2013.01); *G03G 2221/1645* (2013.01); *G06F 1/20* (2013.01)

(58) Field of Classification Search
CPC ............. G03G 21/206; G03G 15/0887; G03G 15/2064; G03G 2221/1645; G06F 1/20
See application file for complete search history.

(56) References Cited

U.S. PATENT DOCUMENTS

| | | | | |
|---|---|---|---|---|
| 2007/0059010 A1* | 3/2007 | Arimoto | ............ | G03G 15/2017 399/69 |
| 2009/0245848 A1* | 10/2009 | Suzuki | ............... | G03G 15/2039 399/92 |
| 2011/0103840 A1* | 5/2011 | Oda | ..................... | G03G 15/104 399/240 |
| 2011/0311261 A1* | 12/2011 | Yamashita | ......... | G03G 15/0887 399/92 |
| 2017/0017200 A1* | 1/2017 | Oya | ..................... | G03G 21/206 |

FOREIGN PATENT DOCUMENTS

JP       2011-022296 A    2/2011

* cited by examiner

*Primary Examiner* — Rodney Bonnette
(74) *Attorney, Agent, or Firm* — Sughrue Mion, PLLC

(57) ABSTRACT

A developing device includes a developing unit; an airflow generator that generates an airflow in a space accommodating the developing unit; a partitioning member that has at least two openings located upstream of the developing unit in a direction of the airflow and that divides a region in which the developing unit is present from a region in which the developing unit is not present, the two openings being located at an upstream position and a downstream position in the direction of the airflow, at least the opening at the upstream position being provided with an opening-closing mechanism; and an element that performs at least an exothermic process in the space accommodating the developing unit.

14 Claims, 4 Drawing Sheets

| PELTIER DEVICE | UPSTREAM OPENING-CLOSING MECHANISM | DOWNSTREAM OPENING-CLOSING MECHANISM | COOLING EFFECT | DEW CONDENSATION REDUCING EFFECT | CONTAMINATION REDUCING EFFECT |
|---|---|---|---|---|---|
| ENDOTHERMIC | OPEN | OPEN | B | D | C |
| ENDOTHERMIC | OPEN | CLOSED | A | D | D |
| ENDOTHERMIC | CLOSED | OPEN | C | C | A |
| EXOTHERMIC | OPEN | OPEN | D | B | C |
| EXOTHERMIC | OPEN | CLOSED | D | A | D |
| EXOTHERMIC | CLOSED | OPEN | C | C | B |

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2017-044840 filed Mar. 9, 2017.

BACKGROUND

(i) Technical Field

The present invention relates to a developing device and an image forming apparatus.

(ii) Related Art

A developing device that performs a developing process in an electrophotographic image forming apparatus by using a developer containing toner is known.

SUMMARY

According to an aspect of the invention, there is provided a developing device including a developing unit; an airflow generator that generates an airflow in a space accommodating the developing unit; a partitioning member that has at least two openings located upstream of the developing unit in a direction of the airflow and that divides a region in which the developing unit is present from a region in which the developing unit is not present, the two openings being located at an upstream position and a downstream position in the direction of the airflow, at least the opening at the upstream position being provided with an opening-closing mechanism; and an element that performs at least an exothermic process in the space accommodating the developing unit.

BRIEF DESCRIPTION OF THE DRAWINGS

An exemplary embodiment of the present invention will be described in detail based on the following figures, wherein.

DETAILED DESCRIPTION

Exemplary Embodiment

Figure 1:
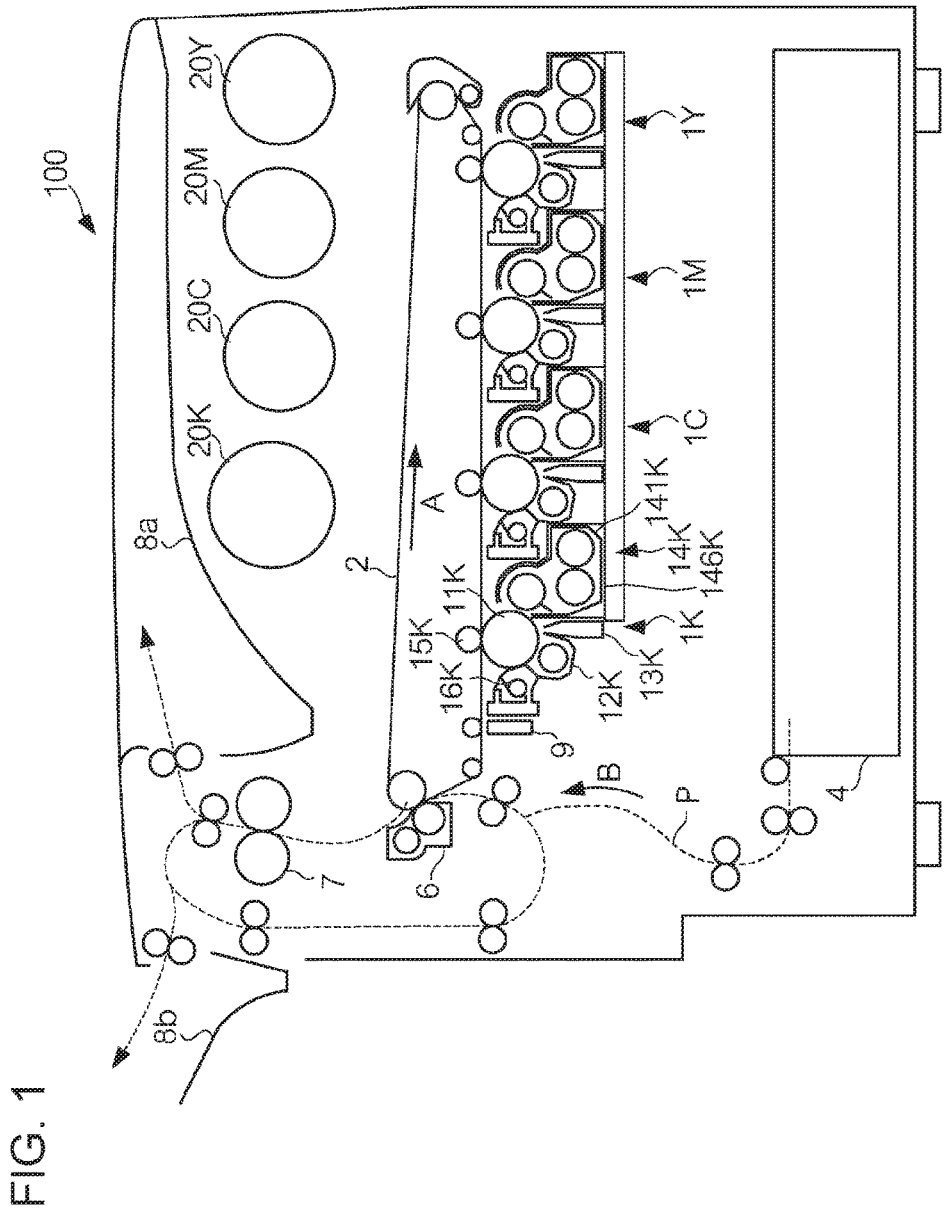
FIG. 1 is a schematic diagram illustrating the structure of an image forming apparatus according to an exemplary embodiment of the present invention.

An exemplary embodiment of the present invention will now be described. FIG. 1 is a schematic diagram illustrating the structure of an image forming apparatus 100 according to an exemplary embodiment of the present invention. FIG. 1 illustrates the cross-sectional structure of the image forming apparatus 100 viewed from the front. The image forming apparatus 100 is an electrophotographic image forming apparatus that has, for example, printing, copying, and facsimile functions, and forms an image corresponding to image data on a paper sheet that serves as an example of a medium. Image forming units 1Y, 1M, 1C, and 1K respectively form yellow (Y), magenta (M), cyan (C), and black (K) images. An intermediate transfer belt 2 is wrapped around plural rollers, and is rotated by the rollers in the direction of arrow A. The images formed by the image forming units 1Y, 1M, 1C, and 1K are transferred onto the outer peripheral surface of the intermediate transfer belt 2 in a superposed manner in a first transfer process.

A storage unit 4 stores plural paper sheets. Each paper sheet is fed from the storage unit 4 and transported by plural transport rollers along a transport path P in the direction of arrow B. A transfer device 6 performs a second transfer process for transferring the images that have been transferred to the intermediate transfer belt 2 in the first transfer process onto the paper sheet. A fixing device 7 fixes the images that have been transferred to the paper sheet in the second transfer process to the paper sheet by applying heat and pressure. The paper sheet to which the images have been fixed is transported by plural transport rollers and discharged to a discharge unit 8a or a discharge unit 8b.

The structure of the image forming unit 1K will be described as an example of the structures of the image forming units 1Y, 1M, 1C, and 1K. The image forming unit 1K includes a photoconductor 11K that serves as an image carrier; a charging device 12K that charges the photoconductor 11K to a predetermined charge potential; an exposure device 13K that forms an electrostatic latent image by exposing the photoconductor 11K to light in accordance with black (K) image data included in YMCK image data; a developing device 14K that forms a black image on the surface of the photoconductor 11K by developing the electrostatic latent image with black toner; a first transfer roller 15K that performs the first transfer process for transferring the image onto the intermediate transfer belt 2; and a cleaning device 16K that removes toner that remains on the surface of the photoconductor 11K after the first transfer process.

The developing device 14K contains developer including toner, which is non-magnetic, and carrier, which is magnetic, and develops the above-described electrostatic latent image by supplying the toner included in the developer to the electrostatic latent image. The developing device 14K is connected to a toner-supplying unit 20K by a supply path (not shown), and the toner is supplied from the toner-supplying unit 20K to the developing device 14K as necessary. A developing unit 141 includes a developer container, a developing roller, and a stirring roller, and a long-axis direction thereof is perpendicular to the plane of FIG. 1.

The image forming units 1Y, 1M, and 1C have structures similar to that of the image forming unit 1K except that they form images of different colors among Y, M, C, and K. Therefore, description of the structures of the image forming units 1Y, 1M, and 1C will be omitted. In the following description, when it is not necessary to distinguish between the structures of the image forming units 1Y, 1M, 1C, and 1K, the letters "K", "Y", "M", and "C" are not attached to the reference numerals. For example, the photoconductor of the image forming unit 1Y is referred to as "photoconductor 11Y", and the photoconductors 11Y, 11M, 11C, and 11K are referred to simply as "photoconductors 11" when they do not need to be distinguished from each other.

Figure 2:
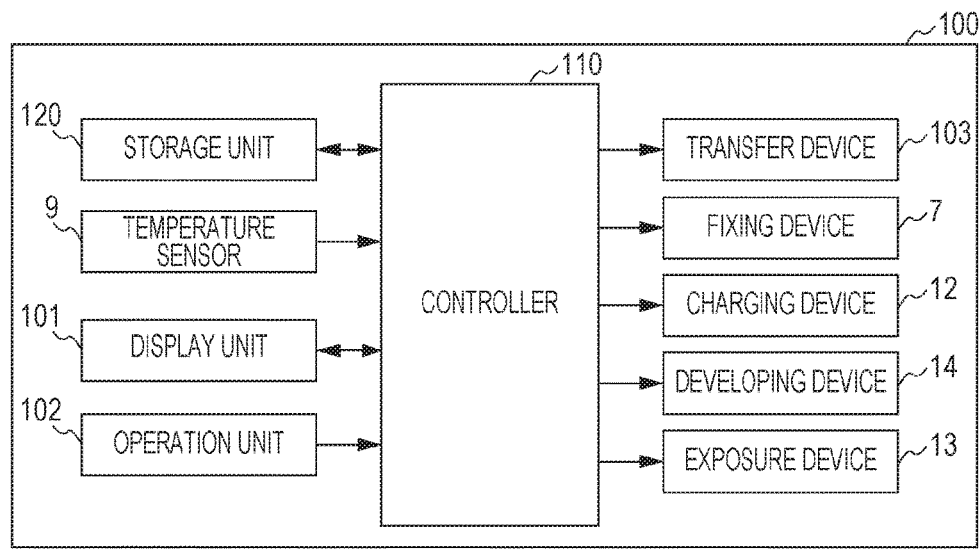
FIG. 2 is a block diagram illustrating the hardware structure of an image forming apparatus.

The hardware structure of the image forming apparatus 100 will now be described with reference to the block diagram of FIG. 2. The controller 110 includes a central processing unit (CPU), a read only memory (ROM), a random access memory (RAM), and an application specific integrated circuit (ASIC). The CPU executes programs stored in the ROM or a storage unit 120 to control a display unit 101, an operation unit 102, a transfer device 103, a fixing device 7, a charging device 12, a developing device 14, and an exposure device 13. The transfer device 103 includes the first transfer rollers 15 that perform the first transfer process, the intermediate transfer belt 2, and the transfer device 6 that performs the second transfer process. The storage unit 120 is, for example, a hard disk, and stores the above-described programs and a group of data including thresholds used when the controller 110 executes operations. A temperature sensor 9 measures the temperature inside the developing device 14 and the temperature outside the image forming apparatus 100.

Figure 3:
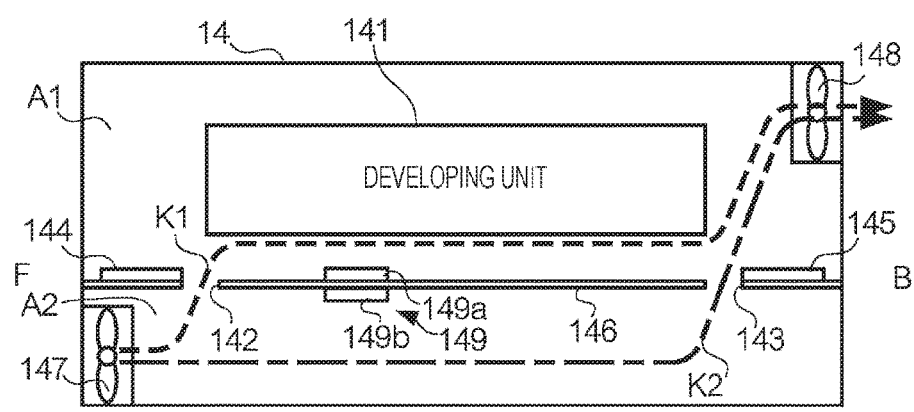
FIG. 3 is a schematic diagram illustrating the cross sectional structure of a developing device included in the image forming apparatus.

FIG. 3 is a schematic diagram illustrating the vertical cross-sectional structure of the developing devices 14. The developing devices 14Y, 14M, 14C, and 14K have the same structure. In FIG. 3, the front of the image forming apparatus 100 is indicated by 'F', and the back of the image forming apparatus 100 is indicated by 'B'. The developing unit 141 is disposed in a housing of the developing device 14. The developing unit 141 includes a developer container, a developing roller, and a stirring roller, and develops the electrostatic latent image by supplying the toner contained in the developer to the electrostatic latent image. The space inside the housing of the developing device 14 is sectioned into a space A1 in which the developing unit 141 is disposed and a space A2 free from the developing unit 141 by a plate-shaped partitioning member 146. The space A1, which is a part of the space inside the housing of the developing device 14, corresponds to a space accommodating the developing unit 141.

The partitioning member 146 has openings 142 and 143. The opening 142 is relatively close to the front (F) surface, and the opening 143 is relatively close to the back (B) surface. The openings 142 and 143 are provided with opening-closing mechanisms that open and close the open regions of the openings 142 and 143 by using shutter members 144 and 145. The opening-closing mechanisms are driven by, for example, a solenoid.

A Peltier device 149 is provided on the partitioning member 146 at a location between the opening 142 and the opening 143. The Peltier device 149 is an element that includes two different types of metals (or semiconductors) that are connected to each other, and performs exothermic and endothermic processes by generating a temperature difference when a current is applied thereto. One end face 149a of the Peltier device 149 is exposed in the space A1, and the other end face 149b of the Peltier device 149 is exposed in the space A2. In the present exemplary embodiment, a developing-unit cooling effect, a dew condensation reducing effect, or a developer contamination reducing effect is enhanced depending on whether the process on the end face 149a exposed in the space A1 is exothermic or endothermic. The Peltier device 149 may be disposed so as to be closer to the opening 142 than to the opening 143 because the effect of the exothermic and endothermic processes increases in such a case.

A fan 148 that discharges the air in the developing device 14 to the outside of the developing device 14 is disposed in the back (B) of the space A1. A fan 147 that introduces the air into the developing device 14 from the outside of the developing device 14 is disposed in the front (F) of the space A2. When the fans 147 and 148 rotate, an airflow that flows from the position of the fan 147 to the position of the fan 148 is generated in the developing device 14. The airflow flows along the broken line K1 when the opening 142 is open and the opening 143 is closed, and flows along the one-dot chain line K2 when the opening 142 is closed and the opening 143 is open. When the openings 142 and 143 are both open, the airflow flows along both the broken line K1 and the one-dot chain line K2. In any case, the airflow generated in the developing device 14 has a vector in the long-axis direction of the developing unit 141 and a vector in a direction that crosses the long-axis direction (short-axis direction). Among the two openings 142 and 143, the opening 142, which is at an upstream side of the airflow in the long-axis direction of the developing unit 141, is hereinafter referred to as an upstream opening 142. Also, the opening 143, which is at a downstream side of the airflow in the long-axis direction of the developing unit 141, is hereinafter referred to as a downstream opening 143.

Figure 4:
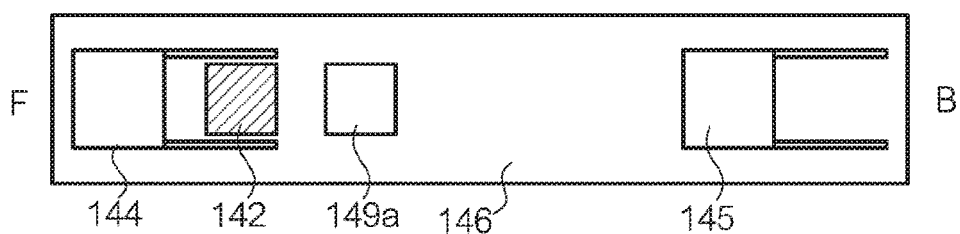
FIG. 4 is a plan view illustrating an example of open/closed states of openings in the developing device.
Figure 5:
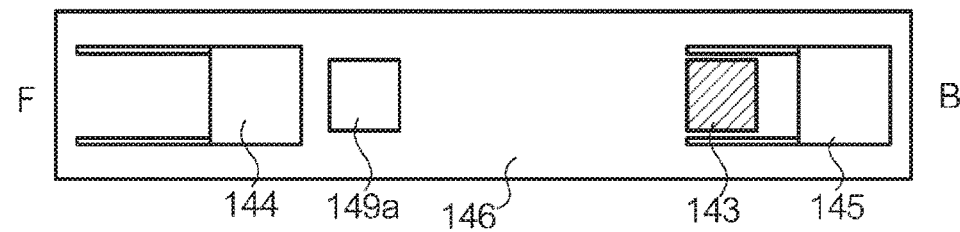
FIG. 5 is a plan view illustrating another example of open/closed states of the openings in the developing device.
Figures 6, 7:
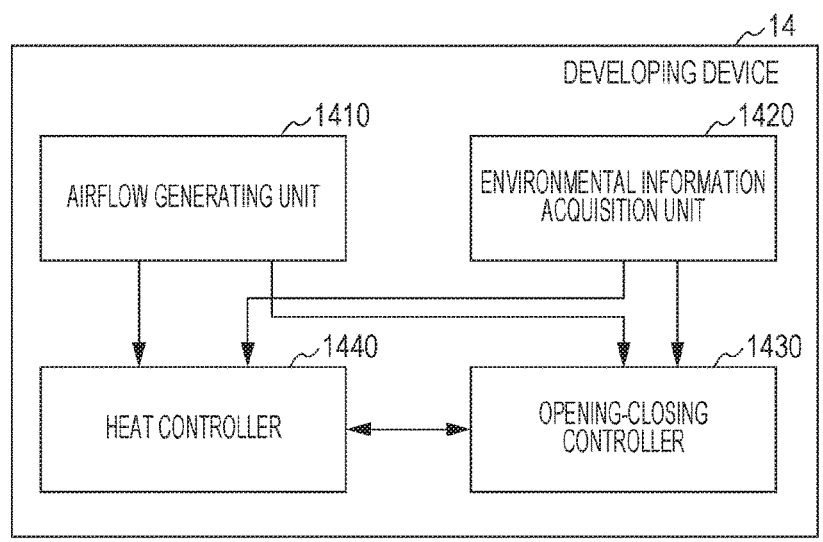
FIG. 6 is a table showing the relationship between open/closed states of the openings, an exothermic/endothermic process of a Peltier device, and effects.
FIG. 7 is a block diagram illustrating the functional configuration of the image forming apparatus.

FIGS. 4 and 5 are plan views illustrating the open/closed states of the openings 142 and 143 in the developing device 14 when viewed from vertically above. FIG. 6 is a table showing the relationship between the open/closed states of the openings 142 and 143, the exothermic/endothermic process of the Peltier device 149, and the effects. The effects of cooling the developing unit 141, reducing dew condensation, and reducing contamination with the developer are selectively achieved depending on the combination of the open/closed states of the openings 142 and 143 and the exothermic/endothermic process of the Peltier device 149. In the cells showing the effects in FIG. 6, "A" means that the effect is highest, "B" means that the effect is second highest, "C" means that the effect is third highest, and "D" means that the effect is lowest.

To cool the developing unit 141, as illustrated in FIG. 4, the upstream opening 142 may be opened and the downstream opening 143 may be closed. In this case, the airflow in the developing device 14 flows along the broken line K1. The airflow that has flowed upward through the upstream opening 142 comes into contact with the bottom of the developing unit 141 and then flows in the long-axis direction of the developing unit 141, as shown by the broken line K1, thereby enhancing heat dissipation from the entirety of the bottom section of the developing unit 141. The cooling effect increases when an endothermic process is performed at the end face 149a of the Peltier device 149. The airflow that flows upward through the downstream opening 143 (airflow that flows along the one-dot chain line K2) comes into contact with the bottom section of the developing unit 141 only in a small area. In addition, the amount of airflow introduced through the upstream opening 142 decreases by the amount of airflow introduced through the downstream opening 143. Therefore, it is not necessary to open the downstream opening 143 to cool the developing unit 141.

FIG. 6 shows that the effect of cooling the developing unit 141 is highest when the upstream opening 142 is open, the downstream opening 143 is closed, and an endothermic process is performed at the end face 149a of the Peltier device 149. The effect is second highest when the upstream opening 142 and the downstream opening 143 are both open and an endothermic process is performed at the end face 149a of the Peltier device 149. The cooling effect is reduced when an exothermic process is performed at the end face 149a of the Peltier device 149. However, a certain level of cooling effect is obtained when the upstream opening 142 is closed and the downstream opening 143 is opened so that the airflow in the developing device 14 is not heated.

The effect of reducing dew condensation in the developing device 14 is highest when the upstream opening 142 is open and the downstream opening 143 is closed, as illustrated in FIG. 4, and when an exothermic process is performed at the end face 149a of the Peltier device 149. Similar to the case of cooling the developing unit 141, the airflow that has flowed upward through the upstream opening 142 comes into contact with the bottom of the developing unit 141 and then flows in the long-axis direction of the developing unit 141, as shown by the broken line K1. At this time, the airflow is heated due to the exothermic process performed at the end face 149a of the Peltier device 149, so that dew condensation is reduced in the developing device 14. The airflow that flows upward through the downstream opening 143 (airflow that flows along the one-dot chain line K2) comes into contact with the bottom section of the developing unit 141 only in a small area. In addition, the amount of airflow introduced through the upstream opening 142 decreases by the amount of airflow introduced through the downstream opening 143. Therefore, it is not necessary to open the downstream opening 143 to reduce dew condensation in the developing device 14.

FIG. 6 shows that the effect of reducing dew condensation in the developing device 14 is highest when the upstream opening 142 is open, the downstream opening 143 is closed, and an exothermic process is performed at the end face 149a of the Peltier device 149. The effect is second highest when the upstream opening 142 and the downstream opening 143 are both open and an exothermic process is performed at the end face 149a of the Peltier device 149. The dew condensation reducing effect is reduced when an endothermic process is performed at the end face 149a of the Peltier device 149 because the temperature difference between the inside of the developing device 14 and the outside of the image forming apparatus 100 increases. However, a certain level of dew condensation reducing effect is obtained when the upstream opening 142 is closed and the downstream opening 143 is opened so that the airflow in the developing device 14 is not cooled.

The effect of reducing contamination in the developing device 14 is highest when the upstream opening 142 is closed and the downstream opening 143 is open, as illustrated in FIG. 5, and when an endothermic process is performed at the end face 149a of the Peltier device 149. In this case, the airflow flows along the one-dot chain line K2 in the developing device 14. Since the airflow that has flowed upward through the downstream opening 143 flows along the one-dot chain line K2, the pressure along the path of the airflow becomes negative, and the developer that floats around the developing unit 141 is transported in the short-axis direction of the developing unit 141 and discharged out of the developing device 14 through the fan 148. Thus, the contamination reducing effect increases. It is known that when the temperature is high, the amount of charge of the developer decreases, and the amount of developer that leaks out of the developing unit 141 increases accordingly. Therefore, to reduce contamination of the developing device 14, an endothermic process may be performed at the end face 149a of the Peltier device 149. If the upstream opening 142 is open, the air around the developing unit 141 will be agitated by the airflow along the broken line K1, and dust will be scattered.

FIG. 6 shows that the effect of reducing contamination in the developing device 14 is highest when the upstream opening 142 is closed, the downstream opening 143 is open, and an endothermic process is performed at the end face 149a of the Peltier device 149. The effect is second highest when the upstream opening 142 is closed, the downstream opening 143 is open, and an exothermic process is performed at the end face 149a of the Peltier device 149. When the upstream opening 142 is open, dust will be scattered. However, a certain level of contamination reducing effect is obtained when the downstream opening 143 is also open.

FIG. 7 is a block diagram illustrating the functional configuration of the developing device 14. The functions illustrated in FIG. 7 are realized by cooperative operation of the developing device 14 and the controller 110. An airflow generator 1410 includes the fans 147 and 148, which generate the airflow that flows through the space accommodating the developing unit 141, more specifically, the airflow having a vector in the long-axis direction of the developing unit 14 and a vector in a direction that crosses the long-axis direction. An environmental information acquisition unit 1420 acquires environmental information of the developing device 14. The environmental information may be the temperatures measured by the temperature sensor 9 (temperature inside the developing device 14 and temperature outside the image forming apparatus 100) and the accumulated developing period determined by the controller 110. The difference between the temperature inside the developing device 14 and the temperature outside the image forming apparatus 100 measured by the temperature sensor 9 serves as an index that shows the occurrence level of dew condensation. The occurrence level of dew condensation increases as the temperature difference increases, and decreases as the temperature difference decreases. A humidity sensor may also be used to estimate the occurrence level of dew condensation. The accumulated developing period serves as an index that shows the level of contamination of the developing device 14 with the developer. An opening-closing controller 1430 controls the opening-closing mechanisms of the upstream opening 142 and the downstream opening 143 in accordance with the acquired environmental information. The heat controller 1440 controls the exothermic/endothermic process of the Peltier device 149 in accordance with the acquired environmental information. The opening-closing controller 1430 and the heat controller 1440 are controlled as described above with reference to FIGS. 4 to 6.

According to the above-described exemplary embodiment, the effects of cooling the developing unit, reducing dew condensation, and reducing contamination with the developer are selectively achievable without turning on and off plural fans.

The above-described exemplary embodiment may be modified as follows.

In the above-described exemplary embodiment, the effects of cooling the developing unit, reducing dew condensation, and reducing contamination with the developer are all selectively achievable. However, the present invention is not limited to this as long as at least two of the effects of cooling the developing unit, reducing dew condensation, and reducing contamination with the developer are selectively achievable.

In the exemplary embodiment, each of the four developing devices 14Y, 14M, 14C, and 14K includes a Peltier device. However, the number of Peltier devices may instead be less than 4, or 5 or more. For example, among the developing devices 14Y, 14M, 14C, and 14K that are arranged side by side, the developing devices 14M and 14C are easily heated. Accordingly, one or two Peltier devices may be disposed near the developing devices 14M and 14C, and the airflow that flows near the one or two Peltier devices may be guided to the developing devices 14Y, 14M, 14C, and 14K by a duct or the like.

There is no limitation regarding the element that performs exothermic and endothermic processes. Also, it is not necessary that the element perform an endothermic process, and the element may perform only an exothermic process. A certain level of cooling effect may be expected when, for example, the outside air is introduced into the developing device 14.

The direction of the airflow is not limited to that in the exemplary embodiment. For example, the fan 148 for discharging the air in the developing device 14 to the outside of the developing device 14 may be provided in the space A1 at a first side of the image forming apparatus 100, and the fan 147 for introducing the air into the developing device 14 from the outside of the developing device 14 may be provided in the space A2 at a second side of the image forming apparatus 100, so that the airflow flows from the second side to the first side of the image forming apparatus 100.

At least one of the fan 147 that introduces the air into the developing device 14 and the fan 148 that discharges the air out of the developing device 14 is provided. The number of fans is not limited to that in the exemplary embodiment.

The number of openings is not limited to two as long as two openings are disposed upstream of the developing unit 141 in the direction of the airflow. It is not necessary that the downstream opening 143 be provided with an opening-closing mechanism as long as the upstream opening 142 is provided with an opening-closing mechanism. In the case where only the upstream opening 142 is provided with an opening-closing mechanism, the upstream opening 142 is opened to cool the developing unit 141 (the downstream opening 143 is initially open) and is closed to reduce contamination in the developing device 14 (the downstream opening 143 is initially open).

The size of the partitioning member 146 (when viewed from vertically above) may at least be larger than the size of the developing unit 141 (when viewed from vertically above). If the partitioning member 146 is smaller than the developing unit 141, for example, the area in which the airflow comes into contact with the developing unit 141 to cool the developing unit 141 is reduced. Therefore, the cooling effect is reduced.

The present invention may also be provided in the form of a program for causing a computer to function as the developing device, or a recording medium that stores the program. The program according to an exemplary embodiment of the present invention may be downloaded into a computer through a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:
    a developing unit;
    an airflow generator that generates an airflow in a space accommodating the developing unit;
    a partitioning member that has at least two openings located upstream of the developing unit in a direction of the airflow and that divides a region in which the developing unit is present from a region in which the developing unit is not present, the two openings being located at an upstream position and a downstream position in the direction of the airflow, at least the opening at the upstream position being provided with an opening-closing mechanism; and
    an element that performs at least an exothermic process in the space accommodating the developing unit.

2. The developing device according to claim 1, wherein the opening in the partitioning member at the downstream position in the direction of the airflow is also provided with an opening-closing mechanism.

3. The developing device according to claim 2, further comprising:
    an opening-closing controller that controls the opening-closing mechanisms in accordance with environmental information of the developing device.

4. The developing device according to claim 3, wherein the opening-closing controller at least opens the opening at the upstream position when a temperature that serves as the environmental information of the developing device exceeds a threshold.

5. The developing device according to claim 4, wherein the opening-closing controller closes the opening at the downstream position when the temperature that serves as the environmental information of the developing device exceeds the threshold.

6. The developing device according to claim 5, wherein the element performs an endothermic process in addition to the exothermic process, and
    wherein the element performs the endothermic process in the space accommodating the developing unit when the temperature that serves as the environmental information of the developing device exceeds the threshold.

7. The developing device according to claim 4, wherein the element performs an endothermic process in addition to the exothermic process, and
    wherein the element performs the endothermic process in the space accommodating the developing unit when the temperature that serves as the environmental information of the developing device exceeds the threshold.

8. The developing device according to claim 3, wherein the opening-closing controller at least opens the opening at the upstream position and the element performs the exothermic process when a dew condensation occurrence level that serves as the environmental information of the developing device exceeds a threshold.

9. The developing device according to claim 8, wherein the opening-closing controller closes the opening at the downstream position when the dew condensation occurrence level that serves as the environmental information of the developing device exceeds the threshold.

10. The developing device according to claim 3, wherein the opening-closing controller at least opens the opening at the downstream position when a level of contamination with developer that serves as the environmental information of the developing device exceeds a threshold.

11. The developing device according to claim 10, wherein the opening-closing controller closes the opening at the upstream position when the level of contamination with developer that serves as the environmental information of the developing device exceeds the threshold.

12. The developing device according to claim 11, wherein the element performs an endothermic process in addition to the exothermic process, and
    wherein the element performs the endothermic process in the space accommodating the developing unit when the level of contamination with developer that serves as the environmental information of the developing device exceeds the threshold.

13. The developing device according to claim 10, wherein the element performs an endothermic process in addition to the exothermic process, and
    wherein the element performs the endothermic process in the space accommodating the developing unit when the level of contamination with developer that serves as the environmental information of the developing device exceeds the threshold.

14. An image forming apparatus comprising:

an image carrier;

a charging device that charges the image carrier;

an exposure device that forms an electrostatic latent image by exposing the image carrier charged by the charging device with light in accordance with image data;

the developing device according to claim 1 that develops the electrostatic latent image formed by the exposure device;

a transfer device that transfers the image developed by the developing device onto a medium; and a fixing device that fixes the image transferred onto the medium by the transfer device to the medium.

* * * * *